United States Patent [19]
Johnson

[11] Patent Number: 5,048,948
[45] Date of Patent: Sep. 17, 1991

[54] MINIMUM WEAR FILM GUIDE FOR ROLLING LOOP FILM TRANSPORT MECHANISM

[75] Inventor: Neil A. Johnson, Portola Valley, Calif.

[73] Assignee: NJ Engineering, Inc., San Jose, Calif.

[21] Appl. No.: 598,544

[22] Filed: Oct. 16, 1990

[51] Int. Cl.$^5$ .............................................. G03B 1/00
[52] U.S. Cl. .................................. 352/184; 352/221; G03B/1/00
[58] Field of Search ......................... 352/184, 185, 221

[56] References Cited

U.S. PATENT DOCUMENTS

| | | | |
|---|---|---|---|
| 3,494,524 | 2/1970 | Jones | 352/184 |
| 3,944,349 | 3/1976 | Jones | 352/184 |
| 4,114,996 | 9/1978 | Shaw | 352/184 |

Primary Examiner—Monroe H. Hayes
Attorney, Agent, or Firm—William E. Hein

[57] ABSTRACT

A film guide mechanism for use in rolling loop film transport mechanisms minimizes film wear and permits higher film speeds on the order of 30 frames per second. The film is sandwiched in its path of travel between a driven inlet drive sprocket and a shock double capstan, the inlet drive sprocket having a plurality of teeth that mate with perforations along each edge of the film and that also mate with grooves in the shock double capstan that is in turn frictionally driven by the driven inlet drive sprocket. The driven inlet drive sprocket and the shock double capstan are slightly concave in shape to prevent contact between these components and the central emulsion area of the film. A fixed inner guide having a radius in an area adjacent the shock double capstan that matches the radius of the shock double capstan and a spring-loaded shock double capstan slide on which the shock double capstan is mounted provide a variable gap to accommodate any backlash or shock rebound of the film as it passes through the gap prior to capture by a rotor of the film transport mechanism. A selectable stop engages the shock double capstan slide to prevent narrowing of the variable gap beyond a predetermined minimum.

6 Claims, 3 Drawing Sheets

MINIMUM WEAR FILM GUIDE FOR ROLLING LOOP FILM TRANSPORT MECHANISM

REFERENCE TO RELATED PATENT

This application is related to U.S. Pat. No. 4,114,996 entitled Inlet Guide Structure for Rolling Loop Film Transport Mechanism, the subject matter of which is incorporated herein by reference.

BACKGROUND AND SUMMARY OF THE INVENTION

This invention relates generally to rolling loop film transport mechanisms of the type used to transport photographic film through a projector, camera or other motion picture apparatus and more particularly to a shock absorbing film guide mechanism for prolonging the life of films employed in such mechanisms.

U.S. Pat. No. 4,114,996 describes a film inlet guide having fixed complementary outer and inner guides adapted to receive film from a drive sprocket of a rolling loop film transport mechanism and to guide the film inwardly toward a path defined between the stator and rotor of the film transport mechanism. This prior art film inlet guide is disadvantageous in several respects. Excessive film wear results from the friction created by the film passing the stationary surfaces of the inlet guide, particularly the nose portion of the outer guide. Over time, this friction produces wear on the nose portion of the outer guide itself, requiring periodic film guide replacement. In addition, a static charge is created by the film passing over the stationary nose portion of the outer guide. This static charge attracts dust and other particles to the film surface immediately prior to projection onto a screen, resulting in magnification of these particles to a size 350 times their actual size. The nose portion of the outer guide of the prior art film inlet guide causes the film to become rigid as it enters the gap on the rotor of the film transport mechanism. When the rigid length of film is impacted by the rotor segments that are travelling at 180 RPM, the film is lightly tugged against the teeth of the inlet drive sprocket, thereby causing film wear and/or damage to the perforations along the edges of the film. The rigidity imparted to the film by this prior art inlet film guide becomes an even more significant problem when film speed is increased from the conventional 24 frames per second to the 30 frames per second at which some projection systems operate. Finally, the film inlet guide of the prior art hinges to an unadjustable indexed position that defines a fixed gap between the inlet sprocket and the film guide. Since this gap is fixed, any backlash or shock rebounds of the film within the gap results in additional abrasion of the film surface.

It is therefore the principal object of the present invention to provide a film guide mechanism for use in rolling loop film transport mechanisms that minimizes film wear and therefore prolongs the life of motion picture film operating at a conventional speed of 24 frames per second and that facilitates higher speeds on the order of 30 frames per second that were previously not attainable using prior art film guide mechanisms.

It is a further object of the present invention to provide a film guide mechanism for use in rolling loop film transport mechanisms that significantly reduces the static charge buildup on the film, resulting in a much cleaner presentation of the film as it is projected onto a large screen.

It is a further object of the present invention to provide a film guide mechanism for use in rolling loop film transport mechanisms that prevents rigidity of the film as it exits the film guide mechanism, thereby reducing the force with which the film impacts the rotor and, as a result, minimizing wear on the film and the film guide mechanism itself.

It is a further object of the present invention to provide a film guide mechanism for use in rolling loop film transport mechanisms that permits easy adjustment, within a particular range, of a film exit gap between a shock double capstan and a fixed inner film guide.

It is a further object of the present invention to provide a film guide mechanism for use in rolling loop film transport mechanisms that includes a shock absorber that permits variability of the film exit gap during operation in response to backlash and rebounding of the film as it passes through the film exit gap, thereby eliminating stress on the film perforations imparted by the teeth of the driven inlet drive sprocket.

These and other objects are accomplished in accordance with the illustrated preferred embodiment of the present invention by providing a driven inlet drive sprocket having a plurality of teeth that mate with perforations along each edge of the film and that also mate with grooves in a shock double capstan that is in turn driven by the driven inlet drive sprocket, thereby sandwiching the film therebetween. The driven inlet drive sprocket and the shock double capstan are slightly concave in shape so that no contact is made between these components and the emulsion area of the film. A fixed inner guide has a radius in an area adjacent. The shock double capstan that matches the radius of the shock double capstan itself to provide a variable gap to accommodate any backlash or shock rebound of the film as it passes through the gap. The gap is made variable by a shock absorber assembly coupling the shock double capstan to an adjusting screw via a spring. The spring constant of the spring is set by means of the adjusting screw, thereby allowing the gap to vary in response to any shock rebounds of the film that may occur within the gap.

DETAILED DESCRIPTION OF THE INVENTION

Figure 1:
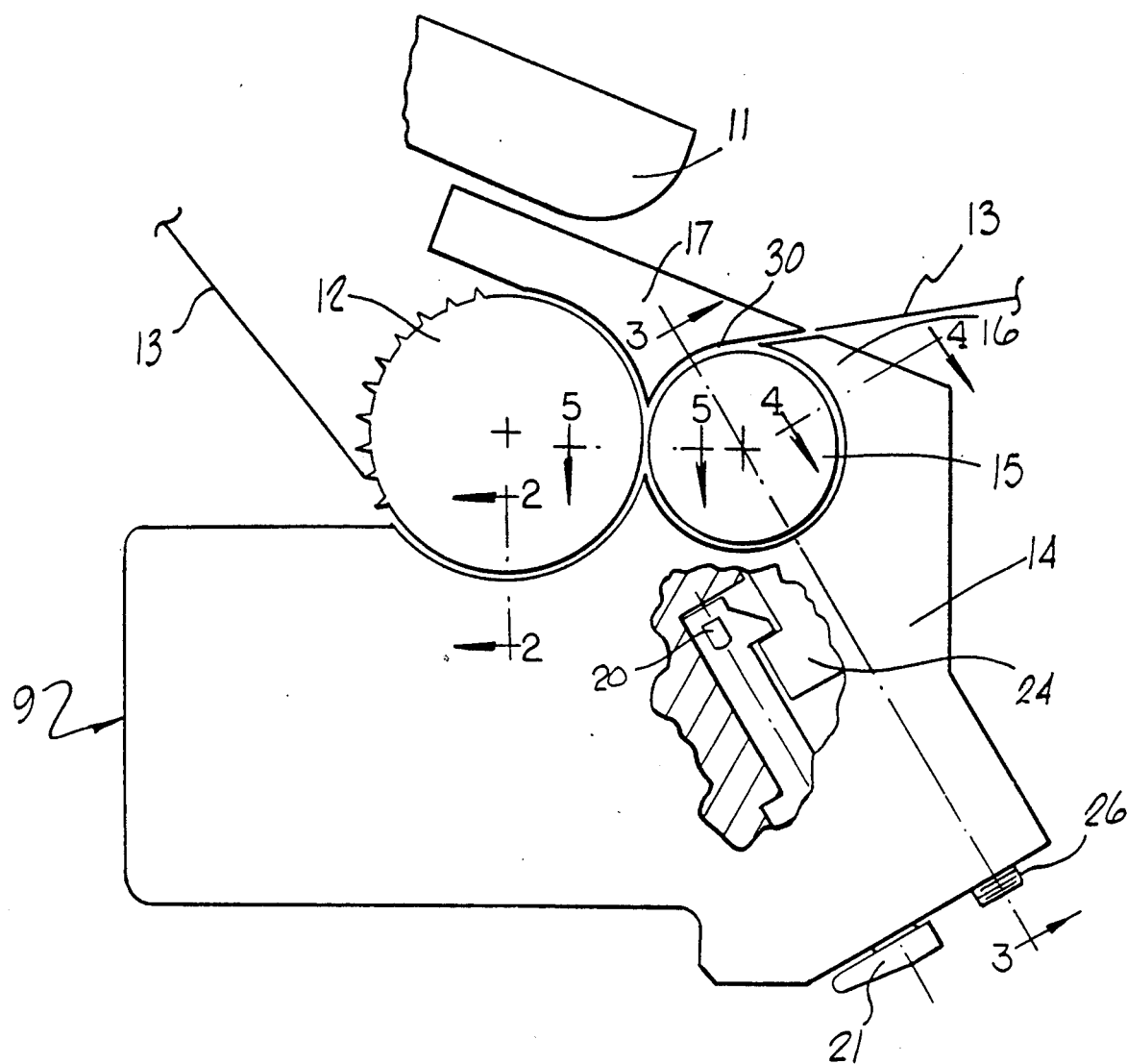
FIG. 1 is a plan view of the film guide mechanism of the present invention.

Referring now to FIG. 1, there is shown a driven inlet drive sprocket 12 that drives film 13 through an inlet guide housing 9, following a path between driven inlet drive sprocket 12 and a shock double capstan 15, between shock double capstan 15 and an inner guide 17, and over a pair of top and bottom guide spool fingers 16, after which it is contacted by rotor segment 11. The inlet guide housing 9 comprises an outer guide 14, shock double capstan 15, and the pair of guide spool fingers 16. Driven inlet drive sprocket 12 and shock double capstan 15 are shaped to have slightly concave outer surfaces so that only the perforated top and bottom edges of the film 13 contact those components, thereby eliminating the opportunity for damage to the central emulsion area of the film 13 that contains the images to be projected. The shock double capstan 15 is frictionally driven by a friction O-ring 22, illustrated in FIGS. 3, 5, and 7, that is attached to the top of shock double capstan 15 and is in engagement with driven inlet drive sprocket 12. During operation of the rolling loop film mechanism in which the film guide of the present invention is employed to guide film 13, shock double capstan 15 is pressed against driven inlet drive sprocket 12, thereby causing shock double capstan 15 to rotate in the opposite direction. Since shock double capstan 15 rotates at the same speed as the film 13, abrasion of film 13 and static charge buildup thereon are minimized. The pair of guide spool fingers 16, attached to the outer guide 14 using flat head screws, for example, serve to prevent the film 13 from wrapping itself around the shock double capstan 15 as it exits the film guide. Inner guide 17 has a radius in an area adjacent shock double capstan 15 that matches the radius of shock double capstan 15 to provide a variable gap 30 to accommodate any shock rebound of film 13 as it passes through the variable gap 30. Shock double capstan 15 includes top and bottom grooves 32, 34, as illustrated in the sectional diagram of FIG. 4, that mate with the teeth on driven inlet drive sprocket 12 in order to capture film 13 therebetween.

Figure 2:
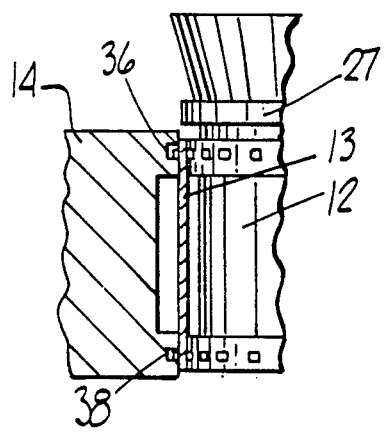
FIG. 2 is a sectional view of a portion of the film guide mechanism of FIG. 1 illustrating the relationship between the film, an driven inlet sprocket, and an inlet guide housing.

Referring now to the sectional diagram of FIG. 2, it may be seen that film 13 passes between the outer guide 14 and driven inlet drive sprocket 12. Top and bottom grooves 36, 38 in outer guide 14 accommodate the teeth on the periphery of driven inlet drive sprocket 12. A cap 27 atop driven inlet sprocket 12 includes a drive surface that engages friction O-ring 22 mounted on shock double capstan 15 for the purpose of driving shock double capstan 15.

Figure 3:
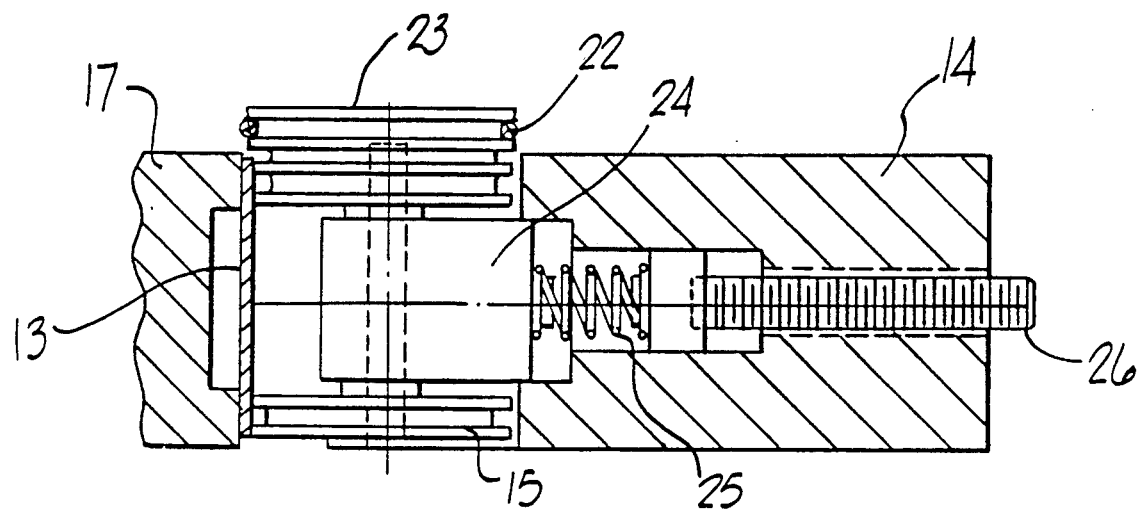
FIG. 3 is a sectional view of a portion of the film guide mechanism of FIG. 1 illustrating a double capstan shock absorber assembly.

Referring now to the sectional diagram of FIG. 3, it may be seen that as film 13 is impacted by rotor segment 11 of FIG. 1 as it exits the film guide, the double capstan slide 24 loads against a spring 25, the spring constant of which is set by means of an adjusting screw 26. The setting chosen for adjusting screw 26 is determinative of the force that must be overcome by film 13 as it travels through the film guide in order to widen variable gap 30 in response to any backlash or shock rebound of film 13. An O-ring retainer 23 is positioned on top of shock double capstan 15 to retain friction O-ring 22 in position for engagement by driven inlet drive sprocket 12, as illustrated in more detail in FIG. 5.

Figure 4:
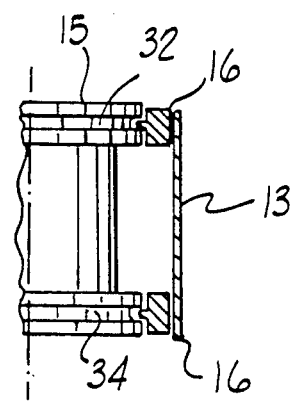
FIG. 4 is a sectional view of a portion of the film guide mechanism of FIG. 1 illustrating the relationship between a shock double capstan and guide spool fingers that act to prevent the film from wrapping around the shock double capstan.

Referring now to the sectional diagram of FIG. 4, it may be seen that the pair of top and bottom guide spool fingers 16, attached to outer guide 14, prevent the film 13 from wrapping around shock double capstan 15 when exiting the film guide mechanism.

Figure 5:
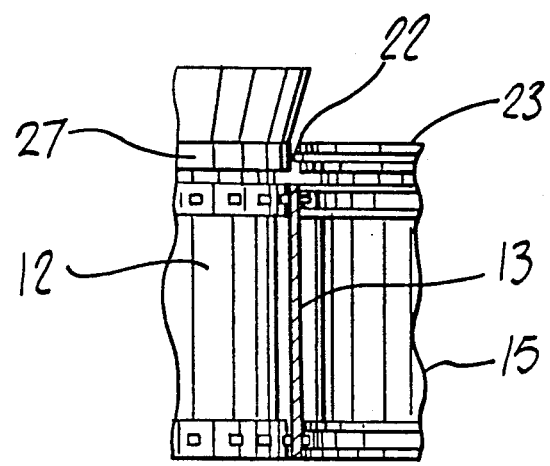
FIG. 5 is a sectional view of a portion of the film guide mechanism of FIG. 1 illustrating the position of the film with respect to the driven inlet drive sprocket and the film guide.

Referring again to the sectional diagram of FIG. 5, it may be seen how film 13 is sandwiched between driven inlet drive sprocket 12 and shock double capstan 15. As stated above in connection with the description of FIGS. 1 and 3, shock double capstan 15 is driven by a frictional O-ring 22 that is attached thereto in position for driving engagement with driven inlet drive sprocket 12.

Figure 6:
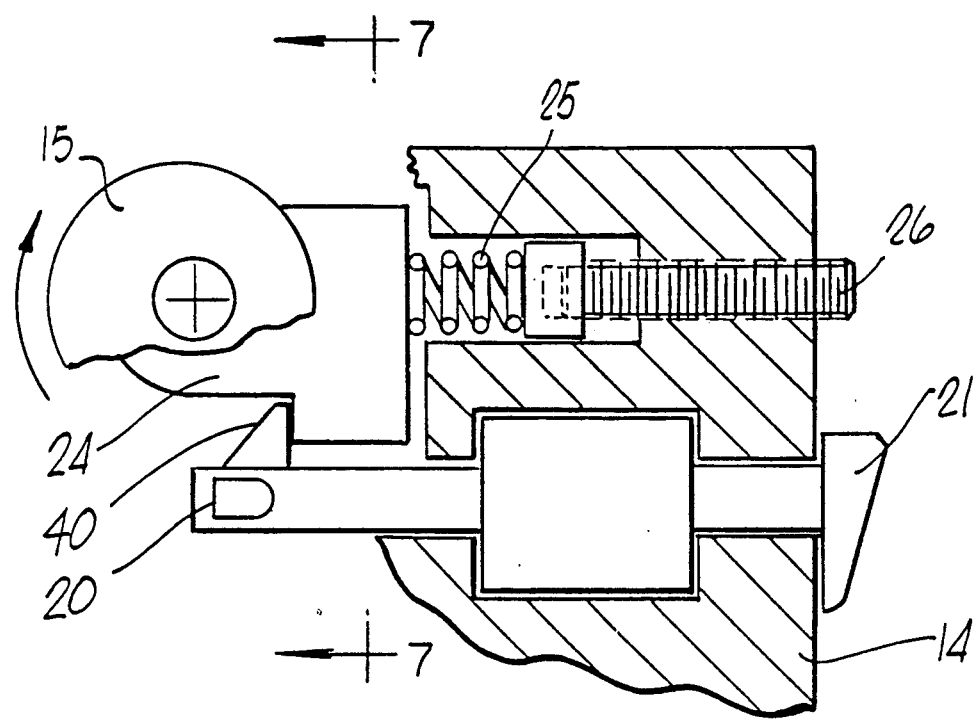
FIG. 6 is a sectional view of a portion of the film guide mechanism of FIG. 1 illustrating the details of a stop that establishes a minimum gap between a shock double capstan and an inner guide.
Figure 7:
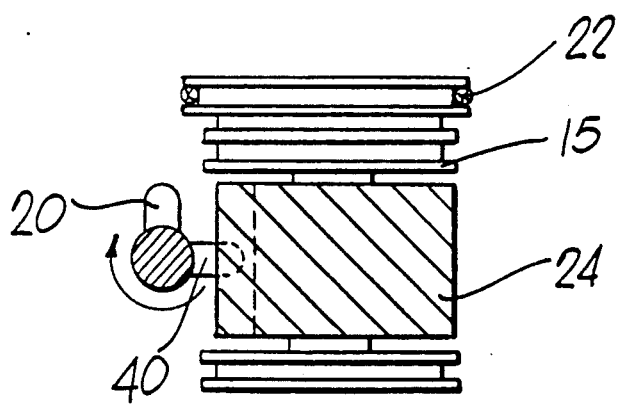
FIG. 7 is a sectional view of a portion of the mechanism of FIG. 6 illustrating the details of operation of the stop.

Referring now to the sectional diagrams of FIGS. 6 and 7, it may be seen how a selected one of two stops 20 and 40 mounted in outer guide 14 may be positioned to engage shock double capstan slide 24 to limit the forward travel of shock double capstan slide 24 and of shock double capstan 15 itself. This limitation establishes a minimum width for variable gap 30 between shock double capstan 15 and inner guide 17 to thereby prevent pinching and resultant excessive wear of film 13 as it travels within variable gap 30. Since the desired minimum width for variable gap 30 is a function of film speed, an appropriate one of the two stops 20 and 40 may be rotated into position in engagement with shock double capstan slide 24 by means of a film speed indicator knob 21 located on the front face of outer guide 14.

I claim:

1. A film guide mechanism for receiving photographic film to be projected by a rolling loop film transport mechanism and for guiding the photographic film into position for engagement by a rotor of said rolling loop film transport mechanism, the film guide mechanism comprising:

a circular inlet drive sprocket having a plurality of teeth spaced around a peripheral surface thereof at top and bottom edges thereof for engaging top and bottom perforations in the film, said inlet drive sprocket adapted for driven rotation so as to pull the film from a film supply;

circular shock double capstan means positioned tangentially adjacent to said inlet drive sprocket and adapted to be rotationally driven by said inlet drive sprocket in a direction opposite said inlet drive sprocket, said shock double capstan means having top and bottom grooves in a peripheral surface thereof for receiving the plurality of teeth of said inlet drive sprocket, the film passing between said inlet drive sprocket and said shock double capstan means;

outer guide means having a concave curved surface adjacent to and complementary with said inlet drive sprocket for maintaining the film in engagement with said plurality of teeth of said inlet drive sprocket;

inner guide means positioned on a side of said inlet drive sprocket and said shock double capstan means opposite from said outer guide means, said inner guide means having a concave curved surface adjacent to and complementary with said shock double capstan means, a film exit gap through which the film passes being defined between the peripheral surface of said shock double capstan means and the concave curved surface of said inner guide means.

2. A film guide mechanism as in claim 1 further comprising spring-loaded slide means coupled to said shock double capstan means for permitting translational motion of said shock double capstan means with respect to said concave curved surface of said inner guide means to thereby permit said film exit gap to vary in response to backlash and shock rebounding of the film as it passes through said film exit gap.

3. A film guide mechanism as in claim 1 wherein the peripheral surface of each of the inlet drive sprocket and shock double capstan means is concave to prevent contact with a central emulsion area of said film.

4. A film guide mechanism as in claim 1 wherein said shock double capstan means further comprises retainer means and an O-ring retained within said retainer means, said shock double capstan means being rotationally driven by frictional coupling between said 0-ring and said inlet drive sprocket.

5. A film guide mechanism as in claim 1 wherein said spring-loaded slide means includes stop means for selecting a minimum width of said film exit gap.

6. A film guide mechanism as in claim 1 wherein said outer guide means includes finger means adjacent said shock double capstan means for guiding the film out of the film guide mechanism and preventing the film from wrapping around said shock double capstan means.

* * * * *